(No Model.)
J. O. DRAKE.
FRYING PAN.
No. 324,671. Patented Aug. 18, 1885.
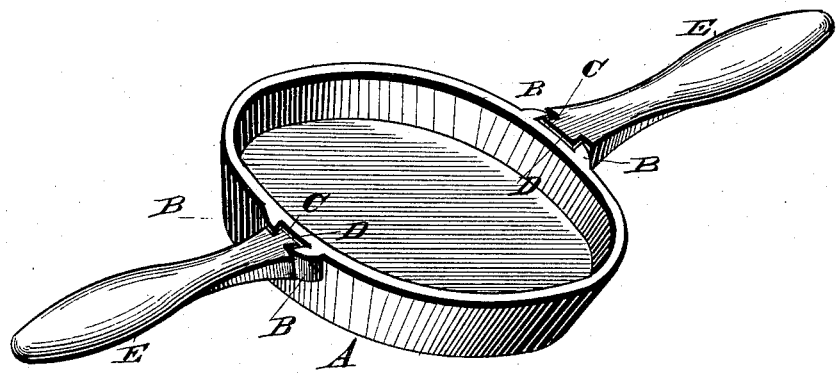
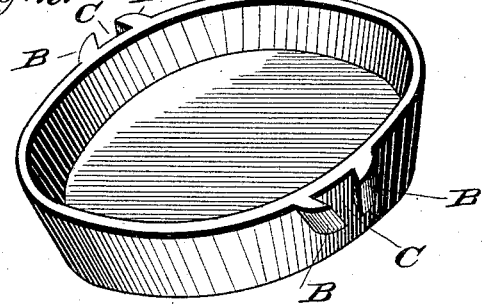
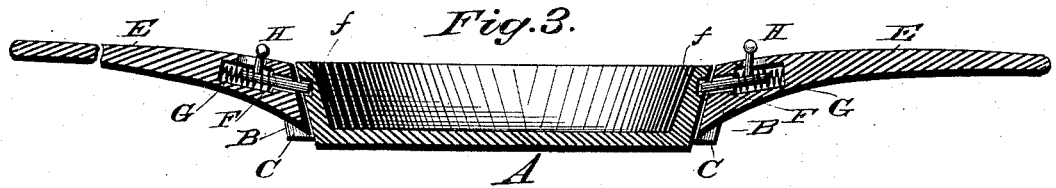
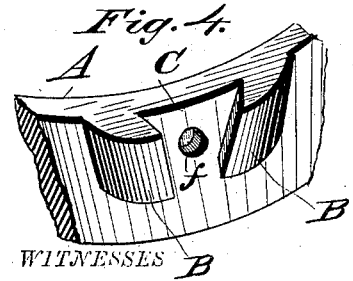
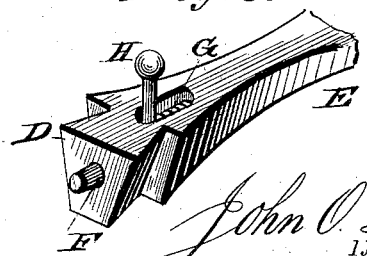
WITNESSES
Phil C. Dietrich
Wm. Bagger
John O. Drake,
INVENTOR
By Louis Bagger & Co,
Attorney

UNITED STATES PATENT OFFICE.

JOHN OLIVER DRAKE, OF FORT SCOTT, KANSAS.

FRYING-PAN.

SPECIFICATION forming part of Letters Patent No. 324,671, dated August 18, 1885.

Application filed April 14, 1885. (No model.)

*To all whom it may concern:*

Be it known that I, JOHN O. DRAKE, a citizen of the United States, and a resident of Fort Scott, in the county of Bourbon and State of Kansas, have invented certain new and useful Improvements in Frying-Pans; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved frying-pan, showing both handles in place. Fig. 2 is a similar view of the pan with the handles removed; and Figs. 3, 4, and 5 are detail views illustrating a modified construction of the catch by means of which the handle is fastened detachably upon the pan.

Similar letters of reference indicate corresponding parts in all the figures.

My invention has relation to frying-pans or skillets; and it consists in constructing the same with a pair of removable handles, which are fastened to the body of the pan by a peculiarly-constructed catch or lock, substantially in the manner and for the purpose which will be hereinafter more fully described and claimed.

In the accompanying drawings, A denotes the body of the pan or skillet, which is cast with ears or projections B B, arranged upon the sides of the pan diametrically opposite each other. These ears or projections are so constructed as to form dovetailed slots or recesses C on opposite sides of the pan, which are adapted to engage and interlock with the dovetailed projections D on the handles E; but the recess C on one side of the pan is larger at the bottom than at the top, and the projection D on the handle for that side of the pan is of a corresponding shape, so that this handle is fastened in its recess by inserting the projection D into the recess from the under side. On the other side of the pan, however, the recess C is larger at the top than bottom, the sides of the recess approaching each other gradually in a downward direction, and the projection D for the handle, which is to go on that side of the pan, is of a corresponding shape, so that that handle must be fastened to the pan by inserting the projection of the handle into its recess from the top. By this construction the body of the pan may be reversed or turned upside down to discharge its contents without dropping off of the handles, one of which is held in each hand.

If desired, the handles may be constructed with spring-catches, consisting of a knob, F, and a spring, G, inserted into a recess in the handle, and operated to force the knob F into a recess, *f*, in the body of the pan. Where this construction is adopted the knob F should have a rearwardly-projecting bolt passing through the coils of its actuating-spring, and having a projecting knob or finger-piece, H, projecting through a slot in the handle, so that the knob may readily be disengaged from the body of the pan when it is desired to remove the handles. This construction I have shown in Figs. 3, 4, and 5 of the drawings.

Having thus described my invention, I claim and desire to secure by Letters Patent of the United States—

1. A frying-pan or skillet having on one side a dovetailed recess larger at the top than at the bottom and on the opposite side a dovetailed recess larger at the bottom than at the top, in combination with a pair of handles constructed with dovetailed heads or projections adapted to engage and interlock with the recesses on opposite sides of the pan, substantially as set forth.

2. The combination of the pan or skillet A, provided on opposite sides with dovetailed recesses C and sub-recesses *f*, and handles E, provided with the dovetailed heads or projections D, adapted to fit the recesses C, and spring-actuated bolts F, adapted to engage the sub-recesses *f*, substantially as and for the purpose set forth.

In testimony that I claim the foregoing as my own I have hereunto affixed my signature in presence of two witnesses.

JOHN OLIVER DRAKE.

Witnesses:
AUGUSTUS GRAFF,
AMOS G. MOULTON.